E. THOMSON.
APPARATUS FOR ELECTRIC WELDING.
APPLICATION FILED FEB. 20, 1915.
1,168,346.
Patented Jan. 18, 1916.
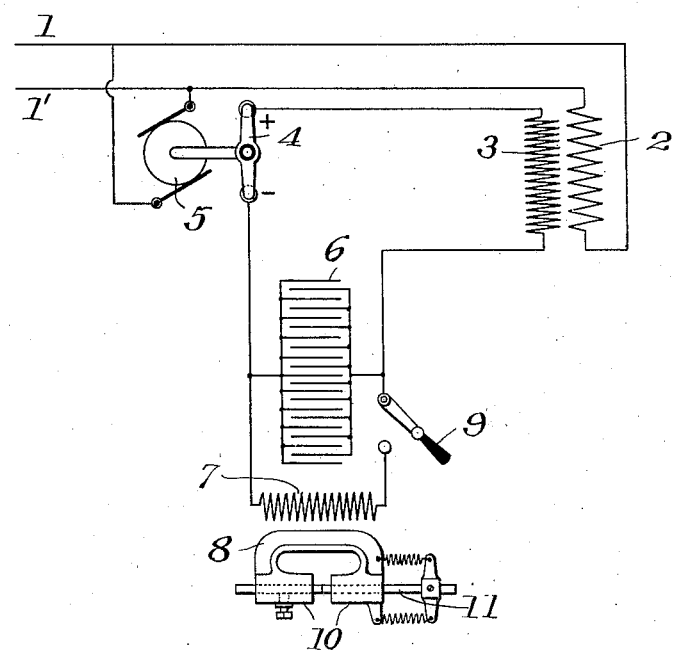
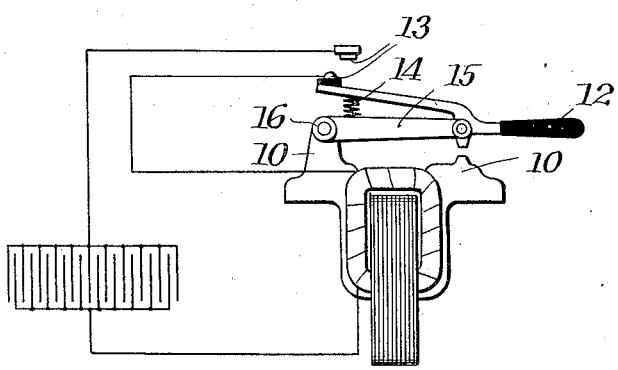
WITNESSES
F. B. Townsend
E. S. Robinson
INVENTOR
Elihu Thomson
BY
Townsend & Dicke
ATTORNEYS

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

APPARATUS FOR ELECTRIC WELDING.

1,168,346.  Specification of Letters Patent.  Patented Jan. 18, 1916.

Application filed February 20, 1915. Serial No. 9,575.

*To all whom it may concern:*

Be it known that I, ELIHU THOMSON, a citizen of the United States, and a resident of Swampscott, in the county of Essex and State of Massachusetts, have invented certain new and useful Improvements in Apparatus for Electric Welding, of which the following is a specification.

My invention relates to an apparatus for electric welding by what is sometimes called a snap weld, that is to say, a weld in which the welding current is applied for a very brief period of time. In this kind of welding the weld is made so rapidly that the delivery of energy at the meeting point of two abutting pieces, or in a spot weld, between the electrodes, is due to the instantaneous flow of very large current which rapidly heats the joint or point of junction to a high temperature, thereby making its resistance instaneously much greater than the rest of the welding circuit. Inasmuch as the leakage of heat from the point of weld is less the less the time taken to make said weld, a snap weld properly effected conduces to economy in the use of energy besides being one of the best forms of welding for certain purposes, particularly for small butt-welding work or for spot welds of small area and thin metal.

My invention consists of the improved arrangement or combination of devices hereinafter described and specified in the claims and whereby the discharge of a condenser may be utilized for producing the welding current.

In the accompanying drawings Figure 1 is a general diagram and plan of an apparatus embodying my invention, the invention being shown in this figure of drawings as used for butt-welding. Fig. 2 illustrates one of the forms of apparatus whereby spot welding may be conducted according to my invention but with the means for charging the condenser omitted.

Referring to the arrangement shown in Fig. 1: Let 1, 1' be lines leading from say, an alternating current source, and 2, 3 be the windings of a transformer in which 2 is the primary of comparatively low voltage, while 3 is a secondary in close inductive relation thereto which is wound to give a voltage of say 10,000 or 20,000 volts or more. One of the terminals of the coil 3, which may be marked plus, is carried to a fixed electrode between which and another similar electrode is a revolving bar, well insulated, shown at 4, driven synchronously by a synchronous motor 5. The bar 4 will always be in the vertical position when the terminal of 3 is say, plus, and when it reverses, the bar 4 will be in a horizontal position and no discharge will pass. The function of the transformer secondary is thus merely as a source of high tension direct current for charging the condenser 6. In other words, up to this point the arrangement is similar to what is known as the "Lemp selector." This unidirectional discharge obtained by selecting the tops of the waves of the step-up transformer or secondary 3 is used as a convenient means for charging a large capacity high tension condenser 6 of voltage say, anywhere from 10,000 or more volts. This charging can go on continuously, while the discharge of the condenser 6 is at the will of the operator, and through a high tension primary 7, wound with many turns, which is the primary of a welding transformer, the secondary of which is 8, the association between the coil 7 and 8 being as close as possible. Depending, however, on the inductance of the transformer circuits mutually, and self-induction, the discharge of the condenser will be converted into a fairly high frequency oscillatory discharge, as if the coil 7 were fed with the high frequency dynamo, but the condenser discharge will take place very rapidly and die away. It is as if one had connected to the welding coil (a welding transformer) a very large source of power of a very large capacity dynamo source which, in the ordinary making of a snap weld, is a necessity. The condenser, however, being charged through the time from the circuit 1, 1', puts a much more steady load on the circuit and is able to give out energy at an enormous rate for a short interval. The work pieces held in the welding clamps are put together under considerable force and the discharge of the condenser by the closing of the control switch 9 at the will of the operator or otherwise flashes the condenser current through and gives an instantaneous very high current in the welding circuit which is sufficient to cause instantaneous heating of the work at the point of junction, sufficient to produce the weld, the pressure which brings or tends to bring them together being at such time sufficient for the purpose. It is desirable that the inertia of the parts which have to move in effecting the weld be as small as possible, and the force therefor is rather high, and I have shown the piece 11 as movable by slipping through the jaws formed in the terminals 10 of the secondary so that no massive jaws have to be set in motion, but merely the inertia of the part itself is concerned.

The invention is useful in its application to delicate spot welding where the effects of the heating must be very closely controlled. In Fig. 2 I have indicated an arrangement suitable for such application. In this figure the terminals 10, 10 of the welding transformer, which are shown placed in very close inductive relation to the primary turns through which the condenser discharge is sent, are arranged to support the opposed electrodes of a spot welding apparatus. One of said electrodes is carried by lever 15 pivoted at 16.

12 is the control or operating handle which forces the electrodes together with any sheet metal pieces that are to be joined between. The electrodes are made of high conductivity metal, slightly convex. The effect of pressing down the handle 12 is to bring the electrode upon the work and pinch it between the electrodes, but the handle 12 is also hinged to or loosely connected with the electrode carrying lever 15 and carries one of the switch contacts 13, so that by a further movement of the handle against the action of a somewhat stiff spring 14 interposed between the handle and lever 15, it can close the switch contacts at 13. The contacts 13, as in Fig. 1, close the circuit of the primary of the welding transformer upon the condenser, so that at will the discharge of the condenser may be flashed through the work. This discharge, however, cannot occur until the work electrodes have been pressed firmly upon the work pieces. The instant the condenser discharge passes the weld is effected.

What I claim as my invention is:—

1. In an electric welding apparatus, the combination of a transformer, a condenser connected to the secondary thereof, means for charging the condenser by unidirectional currents taken from said secondary, a welding transformer and means for connecting the condenser with the primary thereof to effect a weld by the energy of the discharge of the condenser.

2. In an electric welding apparatus, the combination of a source of alternating current, a step-up transformer, means for completing the circuit of the secondary periodically to secure a unidirectional current, a condenser connected to the secondary of said transformer, a welding transformer and connections between said transformer and condenser whereby the condenser may be discharged through the primary thereof to produce in the secondary and work the desired welding current.

3. In an electric welding apparatus, the combination of a condenser, means operating continuously for charging the same with a unidirectional current derived from an alternating current, an electric welding transformer and means for discharging the condenser through the primary of said transformer at the will of the operator to effect a weld.

Signed at Lynn, in the county of Essex and State of Massachusetts this 17th day of February, A. D. 1915.

ELIHU THOMSON.

Witnesses:
JOHN A. MCMANUS, Jr.,
ROBERT SHAND.